US011241639B2

(12) United States Patent
Maj et al.

(10) Patent No.: US 11,241,639 B2
(45) Date of Patent: Feb. 8, 2022

(54) GAS-LIQUID SEPARATOR, HYDROCARBON EXTRACTOR, AND RELATED SEPARATION METHOD

(71) Applicant: TOTAL SA, Courbevoie (FR)

(72) Inventors: Guillaume Maj, Saint Martin d'Uriage (FR); Jacques Danquigny, Idron (FR); Jean-Louis Beauquin, Saint-Faust (FR)

(73) Assignee: TOTAL SA, Courbevoie (FR)

( * ) Notice: Subject to any disclaimer, the term of this patent is extended or adjusted under 35 U.S.C. 154(b) by 334 days.

(21) Appl. No.: 16/319,800

(22) PCT Filed: Jul. 22, 2016

(86) PCT No.: PCT/IB2016/001135
§ 371 (c)(1),
(2) Date: Jan. 22, 2019

(87) PCT Pub. No.: WO2018/015777
PCT Pub. Date: Jan. 25, 2018

(65) Prior Publication Data
US 2019/0217221 A1 Jul. 18, 2019

(51) Int. Cl.
*B01D 17/02* (2006.01)
*E21B 43/38* (2006.01)
*B01D 19/00* (2006.01)

(52) U.S. Cl.
CPC ..... *B01D 17/0217* (2013.01); *B01D 19/0057* (2013.01); *E21B 43/38* (2013.01)

(58) Field of Classification Search
CPC . B01D 17/0217; B01D 19/0057; E21B 43/38; E21B 43/34; E21B 43/36; E21B 43/40; F16N 39/002
See application file for complete search history.

(56) References Cited

U.S. PATENT DOCUMENTS 2,705,053 A * 3/1955 Morris ............... B01D 19/0057
96/212
3,128,719 A * 4/1964 Jongbloed ............... E21B 43/38
166/105.5
(Continued)

FOREIGN PATENT DOCUMENTS

WO 97/25150 A1 7/1997
WO 2004/016335 A2 2/2004
(Continued)

OTHER PUBLICATIONS

International Search Report issued for PCT Application No. PCT/IB2016/001135 dated Feb. 20, 2017.

*Primary Examiner* — Jonathan Miller
*Assistant Examiner* — Gabriel E Gitman
(74) *Attorney, Agent, or Firm* — Troutman Pepper Hamilton Sanders LLP

(57) ABSTRACT

The gas-liquid separator having an introduction duct defining an introduction opening receiving the multiphase fluid stream, and a static first separation stage extending along a longitudinal axis, connected with the introduction duct, the first separation stage including an outer wall, an inner wall and at least an inner baffle inducing an helical movement of the multiphase fluid stream around the longitudinal axis driving a liquid contained in the fluid stream onto the outer wall and a gas contained in the multiphase fluid stream onto the inner wall. The outer wall or/and the inner wall delimit(s) at least a lateral orifice evacuating a respective one of the liquid or the gas separated along the inner baffle, each lateral orifice extending along each inner baffle and defining a lateral staged evacuation of the respective one of the liquid or of the gas in an evacuation canal along the respective inner and outer walls.

16 Claims, 7 Drawing Sheets

(56) References Cited

U.S. PATENT DOCUMENTS

| | | | |
|---|---|---|---|
| 4,074,763 A | | 2/1978 | Stevens |
| 5,389,128 A | | 2/1995 | Lopes |
| 5,474,601 A | * | 12/1995 | Choi ................. B01D 19/0057 |
| | | | 166/105.3 |
| 5,482,117 A | * | 1/1996 | Kolpak ................ E21B 43/121 |
| | | | 166/105.5 |
| 5,531,811 A | * | 7/1996 | Kloberdanz ........... B01D 45/12 |
| | | | 166/105.5 |
| 5,902,378 A | * | 5/1999 | Obrejanu ............... E21B 43/38 |
| | | | 95/248 |
| 6,039,116 A | * | 3/2000 | Stevenson ............... E21B 43/16 |
| | | | 166/105.5 |
| 2009/0211763 A1 | * | 8/2009 | Fowler ............... B01D 19/0057 |
| | | | 166/357 |
| 2015/0308444 A1 | * | 10/2015 | Trottmann ................ B04B 5/10 |
| | | | 415/1 |
| 2017/0292361 A1 | * | 10/2017 | Beauquin ............. E21B 43/121 |

FOREIGN PATENT DOCUMENTS

| | | |
|---|---|---|
| WO | 2008/072087 A2 | 6/2008 |
| WO | 2008/072087 A3 | 6/2008 |
| WO | 2009/006672 A1 | 1/2009 |
| WO | 2009/097869 A1 | 8/2009 |
| WO | 2010/077822 A2 | 7/2010 |
| WO | 2016/030585 A1 | 3/2016 |

\* cited by examiner

GAS-LIQUID SEPARATOR, HYDROCARBON EXTRACTOR, AND RELATED SEPARATION METHOD

CROSS REFERENCE TO RELATED APPLICATIONS

This application is the National Stage of International Application PCT/IB2016/001135 filed Jul. 22, 2016, which published as WO 2018/015777 on Jan. 25, 2018. These applications are incorporated herein by reference in their entirety.

FIELD OF THE INVENTION

The invention relates to a gas-liquid separator for separating a multiphase fluid stream containing hydrocarbons, comprising:
- an introduction duct, the introduction duct defining an introduction opening for receiving the multiphase fluid stream; and
- a static first separation stage extending along a longitudinal axis, connected with the introduction duct, the first separation stage comprising an outer wall, an inner wall and at least an inner baffle located between the outer wall and the inner wall, the inner baffle being configured to induce an helical movement of the multiphase fluid stream around the longitudinal axis to drive a liquid contained in the fluid stream onto the outer wall and a gas contained in the multiphase fluid stream onto the inner wall.

The multiphase fluid preferentially comprises various fluids including liquid and gaseous hydrocarbons and/or water.

Such a gas-liquid separator is in particular intended for use in a gas producing well, in order to improve the performances of the well.

More generally, the separator may also be applied to any gas-liquid separation occurring downhole, and/or potentially above the surface.

BACKGROUND

The production rate of a gas producing well is very often dependent on the quantity of liquid which is simultaneously produced in the well.

Indeed, a gas producing well may also produce water or liquid hydrocarbons simultaneously with the gas. The liquid is for example partly in the form of droplets which are conveyed to the surface along with the gas.

Conventionally, the liquid part of the multiphase fluid stream recovered at the surface is removed from the gas, before transporting or liquefying the gas.

In a gas producing well, at the beginning of the well production, the gas flow rate is usually sufficiently high to convey the liquids it contains towards the surface.

Nevertheless, after some production time, the gas flow rate decreases. This leads to an increase of pressure of the fluid column at the bottom of the well. Indeed, the liquids conveyed in the gas have a higher weight contribution in the gas column when the gas flow rate is smaller due to higher liquid hold-up in the fluid column.

The productivity of the well can be significantly affected. In some instances, below a critical gas flow rate, the liquid cannot any more be lifted by the gas. It then continuously accumulates in the fluid column, until the production eventually stops by well self-killing.

In case of such an accumulation of liquid in the fluid column, to alleviate a potential stop of the production, an artificial lift of the produced liquid is needed, which can be carried out through gas lift or through pumping. Such solutions increase the production costs.

In order to improve the vertical lift performance (VLP) of the well, and to shift its intersection with the inflow performance relationship (IPR) of the well toward higher production rates, WO 2009/097869 discloses a solution in which the free liquid contained in a gas stream is separated at the bottom of the well, in order to decrease the weight of the gas column.

Accordingly, WO 2009/097869 discloses a static extractor comprising a separation stage provided with a centrifugal separator. Above the outlet region of the separator, an upper stage delimiting elongated slots is provided to collect the residual liquid.

Such a separator may be efficient for a gas flow only containing small droplets of liquids. Nevertheless, in some wells, the production sometimes follows a slug regime, in which significant volumes of liquids are extracted in between pockets of gas.

If such a separator was used with a hydrocarbon stream containing a significant volume of liquid, the liquid extraction would be complicated by the fact that the separator tube section would be filled in with liquid, leading to an incomplete and difficult evacuation of the liquid in the upper stage.

The design of such a separator is therefore difficult to control, and is only suitable for very specific production situations.

SUMMARY

One aim of the invention is to provide a very efficient separator for a multiphase fluid which can be easily inserted into a well, without a complicated maintenance, and which nevertheless remains very efficient with various types of flow regimes of the multiphase fluid.

To this aim, the subject-matter of the invention is a gas-liquid separator of the above type, characterized in that:
- the outer wall or/and the inner wall delimit(s) at least a lateral orifice for evacuating a respective one of the liquid or of the gas separated along the inner baffle, the or each lateral orifice extending along the or each inner baffle and defining a lateral staged evacuation of the respective one of the liquid or of the gas in an evacuation canal along the respective one of the outer wall and of the inner wall.

The separator according to the invention may comprise one or more of the following features, taken solely, or according to any potential technical combination:
- the inner wall contains a liquid circulation conduit, able to evacuate the liquid collected in the first separation stage;
- the inner baffle continuously and helicoidally extends along the longitudinal axis of the first separation stage;
- in a cross section containing the longitudinal axis, the or each inner baffle comprises successive transverse regions inclined downwardly between an inner peripheral edge and an outer peripheral edge, at least an orifice being located between two successive transverse regions, above the inner peripheral edge or above the outer peripheral edge;
- the outer wall has at least a lateral orifice for evacuating the liquid separated along the inner baffle, the or each lateral orifice extending along the or each inner baffle and defining a lateral staged evacuation of the liquid in an liquid evacuation canal along the outer wall, the first separation stage having at least an upper gas evacuation opening located above the inner baffle;

an external guiding wall, located around the outer wall facing the first separator, the liquid evacuation canal being defined between the external guiding wall and the outer wall;

it comprises fins interposed between the external guiding wall and the outer wall below the first separation stage, the liquid evacuation canal emerging downwardly between the fins;

it comprises a second separation stage, located in the liquid evacuation canal, below the first separation stage, the second separation stage comprising at least an outer baffle configured to induce an helical movement of the liquid to drive a residual gas contained in the liquid towards the introduction duct, the introduction duct advantageously defining a least a gas recycling passage, emerging in the introduction duct;

the outer baffle is a continuous helical baffle connected to the outer wall, and wherein advantageously, in a cross section containing the longitudinal axis, the outer baffle defines successive transverse regions inclined downwardly towards the external wall;

the inner wall delimits at least a lateral orifice for evacuating a gas separated along the inner baffle, the or each lateral orifice extending along the or each inner baffle and defining a lateral staged evacuation of the gas in a gas evacuation canal along the inner wall.

The invention also concerns a hydrocarbon extractor for a well extractor for a well, comprising a collection space for collecting a multiphase fluid stream extracted from a reservoir, a separator as defined above, the collection space being connected to the introduction duct and a liquid transportation conduit, to evacuate a liquid separated from the multiphase fluid stream.

The extractor according to the invention may comprise one or more of the following features, taken solely, or according to any potential technical combination:

it comprises a pump, the inlet of the pump being connected to the separator, the liquid transportation conduit being connected to the outlet of the pump;

the pump is located below the separator, the pump being able to be activated at least partially by a turbine driven by a gravitational circulation of the liquid circulating from the separator;

the liquid transportation conduit extends through the introduction duct and through the first separation stage.

The invention also concerns a method for separating a multiphase fluid stream into a liquid and a gas comprising:

providing a gas-liquid separator as defined above;

feeding a multiphase fluid stream into the introduction duct to the first separation stage;

circulating the multiphase fluid stream in the first separation stage, an helical movement of the multiphase fluid stream being induced along the or each inner baffle to drive the liquid contained in the hydrocarbon stream onto the outer wall, and to drive a gas contained in the multiphase fluid stream onto the inner wall;

recovering a respective one of the liquid or of the gas separated along the inner baffle through the or each evacuation orifice at stages along the longitudinal axis;

evacuating the one of the liquid or of the gas through the evacuation canal.

BRIEF DESCRIPTION OF THE DRAWINGS

The invention will be better understood, upon reading of the following description, given solely as an example, and made in relation to the appended drawings, in which.

DETAILED DESCRIPTION

In the following description, the terms "upper", "upwards", "upwardly", "lower", "downwards", "downwardly" are given relative to their orientation from the top of the well to the bottom of the well.

The terms "inward", "inside", "outward", "outside" are given relative to a local central axis of the well. The term "inside" generally means closer or oriented towards the central axis, whereas the term "outside" generally means further away or oriented away from the central axis.

Figure 1:
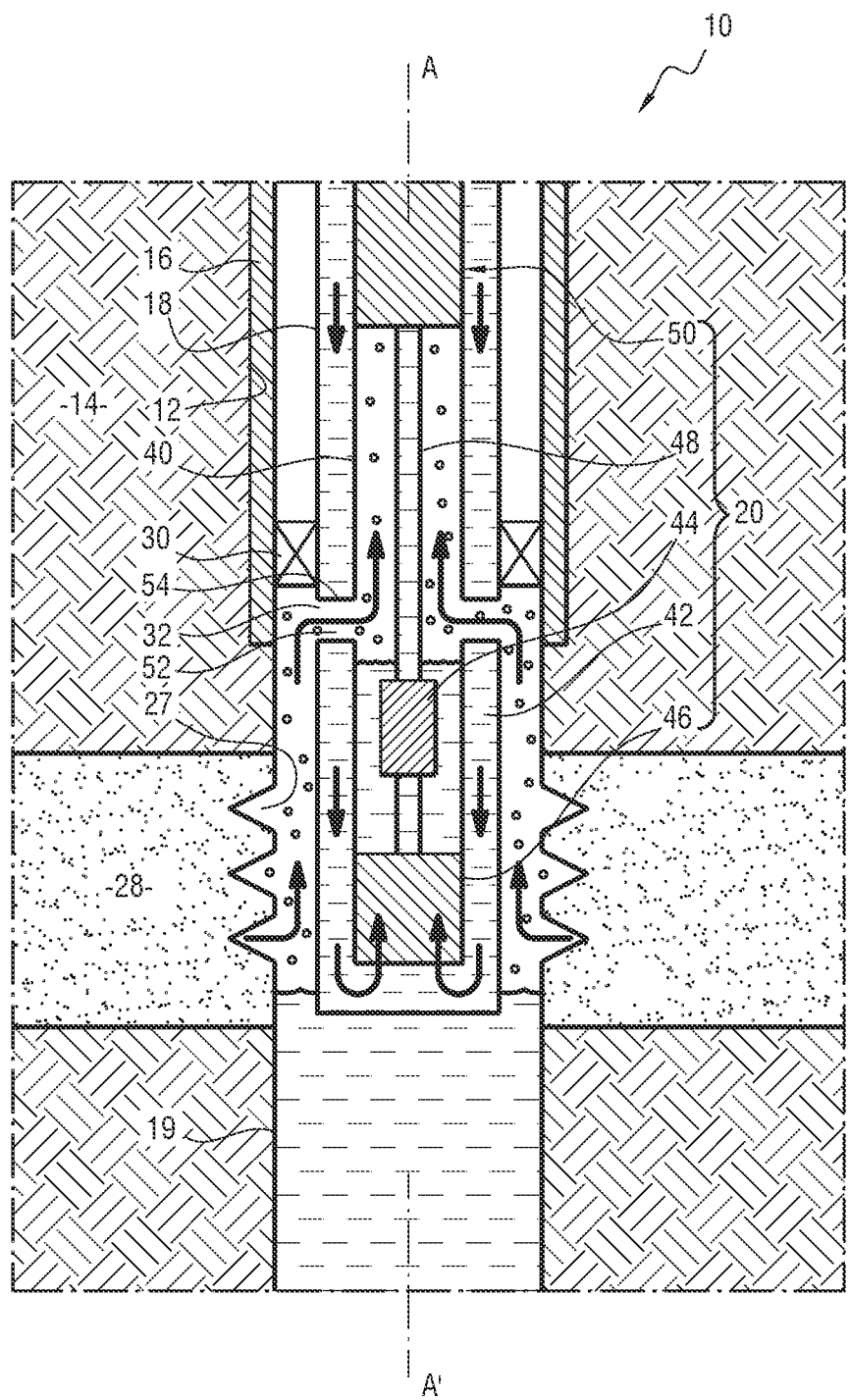
FIG. 1 is a schematic cross-section of the bottom part of a well equipped with an extractor comprising a multiphase fluid separator.

A first fluid production well 10 according to the invention is shown partially in FIG. 1.

The fluid production well 10 comprises at least one borehole 12 bored in a subsoil 14, an outer casing 19, a production tubing 18 inserted in the casing 19. As known in the art, a lower liner (not shown) can be advantageously located at the bottom of the casing 19. The fluid production well 10 further comprises a downhole hydrocarbon extractor 20 including a separator 50 according to the invention.

In the region shown in FIG. 1, the well 10 extends along a local central axis A-A' which is vertical. In a variant, the well 10 has inclined regions, and/or horizontal regions.

The borehole 12 extends from the surface of the subsoil (not shown), which can be located on the ground or at the bottom of a body of water, to a lower formation. As known in the art, the borehole 12 is closed by a wellhead (not shown) located advantageously at the top of the borehole 12.

The casing 19 lines the borehole 12. In this example, the casing 19 comprises an assembly of cylindrical metal strings, which are advantageously held in place with cement 16.

The casing 19 or an alternative lower liner (not shown) is in communication with the reservoir geological formation 28 containing hydrocarbons and/or water. Thus, a multiphase fluid stream, which can be partly made of hydrocarbon, is produced through perforations 27.

In this example, the reservoir geological formation 28 produces essentially gas through perforations 27. In particular, it produces hydrocarbons such as methane, and a minority of liquids, for example water and/or liquid hydrocarbons called oil or condensates. The well 10 is a so-called "gas producing well". The typical oil/condensate-to-gas-ratio produced from a gas well is for example lower than 0.05 to 0.1% (CGR given in standard conditions, namely at a pressure of 1 atmosphere and a temperature of 15° C.). When the gas well does not produce liquid water from reservoir, it nevertheless produces a minimum of about 0.0005% of water-to-gas-ratio (WGR in standard conditions) due to produced gas saturation by rock humidity (fresh water condensation in the production installations). When liquid water is produced with gas from the reservoir 28, water can be salt water (brine) and WGR can then reach up to 0.1% (in standard conditions).

Of course the CGR and WGR values can be 10 times to 100 times, or even more, greater when the same fluid mass/molar composition is given in local conditions of bottom hole or reservoir 28 where pressure can be 10 to 100 bars, even more, due to the pressurized state of the gas fraction, which volume ratio roughly varies as the inverse of pressure ratio.

The multiphase fluid stream produced from the reservoir 28 is under pressure, for example at a pressure greater than 10 bars. Preferentially, the liquid is dispersed in the gas in the form of droplets ("mist flow"), and/or at intervals in the form of liquid pockets, ("slug flow").

The production tubing 18 is surrounded at its lower end with an annular outer packer 30, interposed between the casing 19 and the production tubing 18.

In this example, the production tubing 18 is closed at its lower end. It comprises a plurality of lateral passages 32 (usually called "cross-over") through which the hydrocarbon stream extracted from the reservoir 28 can enter an inner tubing 40 of the extractor 20 inserted inside the production tubing 18. The inner tubing 40 defines an outer annular space 42 with the production tubing 18.

In reference to FIG. 1, in addition to the inner tubing 40, the extractor 20 also comprises a pump 44, inserted in the inner tubing 40 for pumping liquid recovered at the bottom of the inner tubing 40, a turbine 46 connected to the pump 44 to drive the pump 44 using fluid circulation through the turbine 46, and a liquid transportation conduit 48 connecting the outlet of the pump 44 to the surface.

The extractor 20 further comprises a gas-liquid separator 50 according to the invention, mounted at the top of the inner tubing 40.

The inner tubing 40 extends coaxially with the production tubing 18, along a longitudinal axis A-A' of the production tubing 18. Axis A-A' is here represented vertical, but it may be inclined relative to a vertical axis.

The inner tubing 40 opens downwardly at its bottom end. It emerges downwardly towards the bottom of the production tubing 18. It opens upwardly in the separator 50. The inner tubing 40 defines internally a lower space for collecting the multiphase fluid stream (containing gas and liquid hydrocarbon and water) arising from the reservoir 28.

The inner tubing 40 has lateral admission openings 52, which are located facing the passages 32 in the production tubing 18. The admission openings 52 are able to receive the reservoir stream arising from the reservoir 28.

The admission openings 52 are located above the pump 44. They are connected to the lateral passages 32 in the production tubing 18 by closed conduits 54 extending radially through the annular space 42. Liquid collected in the annular space 42 is able to circulate around the closed conduits 54 without contacting the hydrocarbon stream entering the inner tubing 40 through the closed conduits 54.

The pump 44 is able to be activated by the turbine 46 activated by the circulation of liquid descending in the annular space 42 and then climbing in the inner tubing 40.

The activation of the turbine 46 is achieved thanks to the difference in average density of the light upward "gas-lifted" flow in the tubing 40, with respect to the heavy downward liquid-rich flow in the annular space 42. This difference of density results in a difference of pressure between the inlet and the outlet of the turbine 46, which activate the turbine 46. The pump 44 is able to pump liquid contained at the bottom of the inner tube 40 into the liquid transportation conduit 48 up to the surface, through the separator 50.

Figure 2:
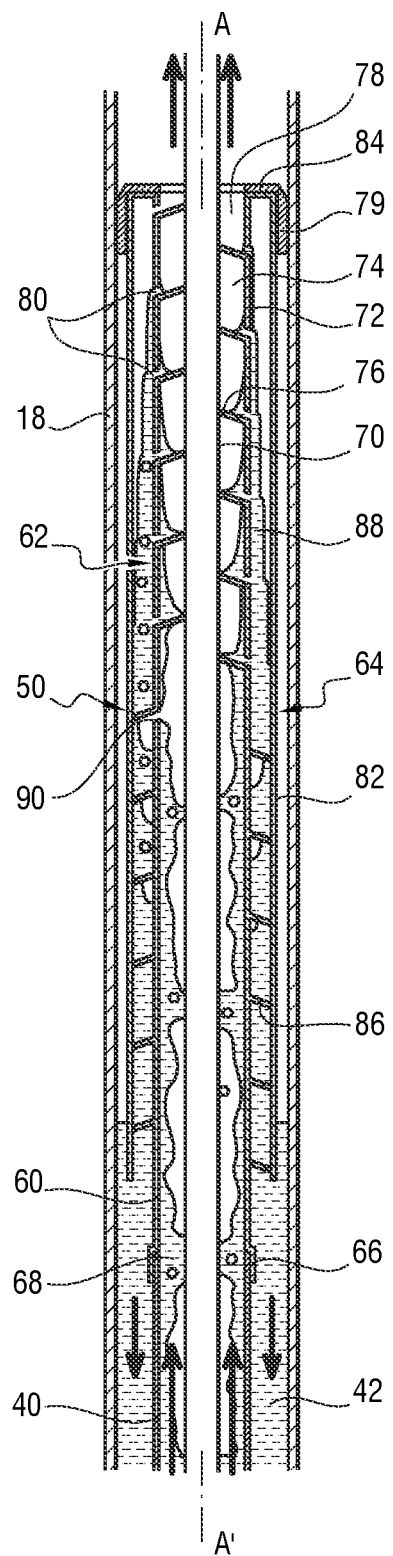
FIG. 2 is a partial sectional view of the separator in the extractor of FIG. 1.
Figure 3:
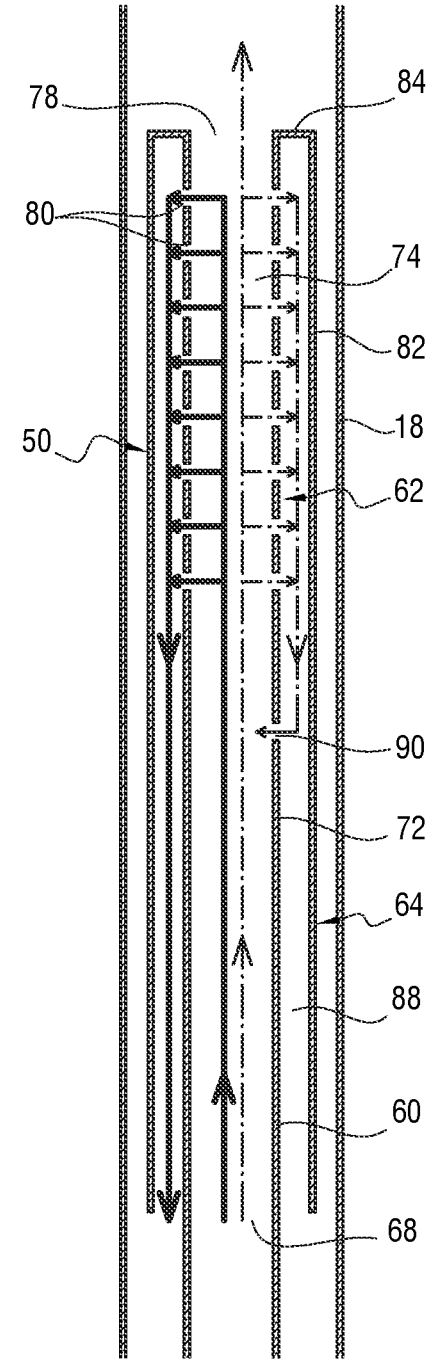
FIG. 3 is a schematic view of the flow circulation in the separator of FIG. 2, the bold solid lines depicting the liquid flow path, while the thin dotted lines depict the gas flow path.

As shown in FIGS. 2 and 3, the separator 50 comprises a lower introduction duct 60 connected to the inner tubing 40 of the extractor 20, and a first separation stage 62 located above the introduction duct 60.

In the example of FIG. 2, the separator 50 advantageously comprises a second separation stage 64, located around the introduction duct 60, downstream of the first separation stage 62.

The separator 50 extends along the local axis A-A' of the production tubing 18.

The introduction duct 60 connects the outlet of the inner tube 40 to the inlet of the first separation stage 62. Its length, taking along the longitudinal axis A-A' is generally comprised between 0% and 400% of the length of the first separation stage 62. In the example of FIG. 2, the introduction duct 60 comprises an upstream collar 66 tightly mounted on the end of the inner tube 40.

The maximum transverse dimension of the introduction duct 60 is generally comprised between 30% and 75% of the maximal transverse direction of the production tubing 18 in which it is inserted.

The introduction duct 60 defines a lower axial introduction opening 68, receiving the hydrocarbon stream arising from the inner tubing 40.

The first separation stage 62 extends in axial continuity with the introduction duct 60, above the introduction duct 60.

It comprises at least an inner peripheral wall 70 and outer peripheral wall 72 defining with the inner wall 70 an intermediate annular separation space 74.

According to the invention, the first separation stage 62 comprises at least one baffle 76 able to induce a helical movement of the hydrocarbon stream along the first separation stage 62. The helical movement of the hydrocarbon stream induces a centrifugal acceleration which is able to drive the liquid contained into the hydrocarbon and water stream onto the outer wall 72, away from the longitudinal axis, while the gas contained in the hydrocarbon stream remains closer to the longitudinal axis A-A'.

The inner wall 70 is tubular. It extends around the longitudinal axis A-A'. It advantageously forms a part of the liquid transportation conduit 48 rising from the lower part of the extractor 20. In this particular case, the inner wall 70 defines an inner liquid circulation passage (not shown), in which the liquid produced in the extractor 20 flows upwards to be extracted out of the well.

The outer wall 72 is also tubular. It extends around the inner wall 70, coaxially with the inner wall 70. In the example of FIG. 2, the transverse dimension of the outer wall 72 is equal to the transverse dimension of the introduction duct 60.

The outer wall 72 emerges downstream at an axial upper opening 78 for evacuating the gas contained in the hydrocarbon and water stream. The upper opening 78 extends at the top of the separator 50, between the inner wall 70 and the outer wall 72. A centralizer 79 is advantageously fitted outside of the separator 50, interposed between the separator 50 and the production tubing 18.

The length of the outer wall 72 is for example comprised between 5 times and 40 times the maximum transverse direction of the outer wall 72.

In the example of FIG. 2, the separator 50 comprises a single helical baffle 76 wound around the inner wall 70 and extending between the inner wall 70 and the outer wall 72, advantageously, with a peripheral gap between the baffle 76 and the inner wall 70.

The pitch of the helix generated by the inner baffle 76, taken along the axis A-A', is for example comprised between 50% and 1000% of the maximum transverse direction of the outer wall 72, taken perpendicular to the longitudinal axis A-A'.

The inner baffle 76 is preferably inclined downwardly in a radial direction from the inner wall 70 to the outer wall 72. It runs from the bottom to the top of the first separation stage 62.

According to the invention, the outer wall 72 defines at least a through opening defining an orifice 80 allowing a staged liquid evacuation from the separation space 74.

In the example of FIG. 2, the outer wall 72 defines a plurality of orifices 80 which are spread along a helical path between turns of the inner baffle 76. The number of orifices 80 range typically from 2 to 6 per turn around the longitudinal axis A-A', in particular from 3 to 5.

The maximum dimension of each orifice 80 is for example smaller than 30 mm.

In a cross section containing the longitudinal axis A-A', the baffle 76 therefore defines a plurality of transverse regions which are inclined downwardly towards the outer wall 72, each orifice 80 being located just above the peripheral edge of the baffle 76.

The inclination of the inclined transverse regions is for example comprised between 20° and 45° relative to a plane perpendicular to the longitudinal axis A-A'.

As shown in the cross-section of FIG. 2, the staged liquid evacuation is obtained at the successive turns of the baffle 76. In an axial plane containing axis A-A', the orifices 80 defines a succession of liquid evacuation passages spaced apart along two opposite generating lines of the outer wall 72 parallel to axis A-A'.

In the example of FIG. 2, the height of each liquid evacuation passage of the orifice 80, taken along axis A-A' is comprised between 5% and 20% of the pitch of the helix defined by the baffle 76.

Each orifice 80 faces the baffle 76 to allow a staged evacuation of the liquid accumulated onto the outer wall 72 in the first separation stage 62. This provides a continuous evacuation of liquid along the first separation stage and prevents the presence of liquid at the top outlet of the separation space 74.

In the example of FIG. 2, the separator 50 comprises a second separation stage 64. The second separation stage 64 comprises an external wall 82, located around the outer wall 72 and an upper closing wall 84 connecting the upper end of the outer wall 72 with the upper end of the upper wall 84. It also comprises an outer baffle 86 for separating the residual gas contained in the liquid collected from the first separation stage 62.

The external wall 82 runs along the first separation stage 62 and advantageously along the introduction duct 60. It is coaxial with the outer wall 72. It defines an external liquid evacuation canal 88 along the first separation stage 62 and advantageously along the inner introduction duct 60.

The liquid evacuation canal 88 is closed upwardly by the upper closing wall 84. It emerges downwardly in the annular space 42 between the inner tubing 40 and the production tubing 18. The orifices 80 emerge laterally into the liquid evacuation canal 88.

The outer baffle 86 is inserted into the liquid evacuation canal 88 along the introduction duct 60, below the first separation stage 62. In this example, it comprises a single helical outer baffle 86, extending between the outer wall 72 to the external wall 82. The outer baffle 80 is inclined downwardly in a radial direction away from the axis A-A'. In cross-section in a plane containing the longitudinal axis A-A', it defines a plurality of spaced apart inclined regions.

According to the invention, the liquid evacuation canal 88 is advantageously connected to the inside of the introduction duct 60 through a gas recycling passage 90, emerging inside the introduction duct 60, as shown in FIG. 3.

The gas recycling passage 90 is here located at the top of the second separation stage 64.

The size of the gas recycling passage 90 is generally smaller than the height of the orifice 80. It is for example comprised between 1% and 10% of the maximal transverse dimension of the introduction duct 60.

The separator 50 is static, i.e. it is able to carry out the separation of the multiphase fluid stream without moving parts.

The operation of the extractor 20 comprising a gas liquid separator 50 according to the invention will be now described.

During production, a multiphase fluid stream exits from the reservoir 28 into the borehole 12. In this example, the multiphase fluid stream contains a majority of gas. It also contains liquid, in the form of liquid droplets or liquid pockets.

The liquid is for example water and/or liquid hydrocarbons.

The multiphase fluid stream under pressure rises along the production tubing 18 and enters the inner tubing 40 through the lateral passages 32 and the admission openings 52 connected by the closed conduits 54.

The multiphase fluid stream then flows upwardly to the introduction duct 60, as shown in FIG. 2. The multiphase fluid stream then enters the first separation stage 62.

Thanks to the geometry of the inner baffle 76, a centrifugal helical upward movement of the multiphase fluid stream is induced around the axis A-A'. The liquid contained in the multiphase fluid stream is driven towards the outer wall 72, whereas the gas remains closer to the axis A-A'.

When the flow rate of the multiphase fluid stream is relatively small, the separation of the liquid from the gas contained in the multiphase fluid stream occurs mainly by gravity. A layer of gas forms above the liquid.

For greater flow rates, an additional separation is produced by the centrifugation of the hydrocarbon flow, which drives the liquid against the outer wall 72.

The successive orifices 80 along the turns of the baffle 76 allow a progressive evacuation of the liquid outside of the outer wall 72 to produce, at the upper opening 78, a liquid free gas stream which is evacuated in the production tubing 18 through the upper opening 78.

The gas which is evacuated at the upper opening 78 has a very low volumetric liquid content, i.e. advantageously the residual volumetric liquid flow rate is typically less than 0.1% of the volumetric gas flow rate evacuated at the upper opening 78.

The liquid which is collected in the orifices 80 along the successive turns of the baffle 76 flows into the liquid evacuation canal 88 and is guided in this canal by the external wall 82.

It then reaches the outer baffle 86. The outer baffle 86 induces a downward helical movement of the liquid. The liquid is driven away from the axis A-A', the residual gas collecting towards the axis A-A'.

The residual gas then flows upwardly to the gas recycling passage 90, if any, and is injected back into the multiphase fluid stream contained in the introduction duct 60. Even with no gas recycling passage 90, the amount of gas which can flow into the outer annular space 42 is quite limited.

The liquid which is collected at the outlet of the second separation stage 64 is poor in gas, i.e. typically less than 1% volume percent of gas of the total flow rate in flowing conditions (not standard conditions).

The liquid flows down by gravity in the annular space 42 between the production tubing 18 and the inner tubing 40. As shown in FIG. 1, it then flows up inside the inner tubing 40 from the bottom to the top, driving the turbine 46.

The rotation of the turbine 46 activates the pump 44. The pump 44 drives a fraction of the circulating liquid flow rate into the liquid transportation conduit 48 to evacuate it from the well. In the configuration of FIGS. 1 and 2, the remaining liquid circulates back within the extractor 20, as in a closed circuit or fountain which drives the turbine 46 and pump 44 assembly.

The separator 50 according to the invention is therefore very efficient when used at the bottom of a well 10 to separate various types of multiphase fluid flow containing gas and liquids, in particular an alternation of gas and liquid pockets, corresponding to the so-called slug or churn two-phase flow regimes.

In spite of very limited steric hindrance of the separator 50, a very efficient segregation of the liquid from the gas is obtained by centrifugal forces, in combination with a staged evacuation of the liquid separated from the multiphase fluid stream, leading to excellent separation performances. The separator 50 is very easy to operate downhole, since it does not comprise any mechanical piece in movement which also improves its reliability as compared with a rotary gas separator.

Even for large liquid and gas flow rates, some liquid, e.g., less than 10 volume % of liquid (respectively some gas, e.g. less than 10 volume % of gas) may be entrained through the upper opening 78 (respectively the outer annular space 42). Nevertheless, the separator according to the invention is extremely efficient, especially in a slug flow regime. The residual fluids which may be entrained are very limited in quantity and deemed acceptable.

Particularly, the progressive evacuation of the liquid favors an efficient separation of the liquid contained in the multiphase flow, even at high liquid contents in the flow, e.g., when pockets of liquids are present.

The measured capacities of the present separator outperformed other concepts of separators which do not combine the gravity/centrifugal separation of the gas and liquid, and the progressive evacuation of the liquid (or of the gas for the configuration of the present invention applied to "liquid rich" producer well).

Figure 4:
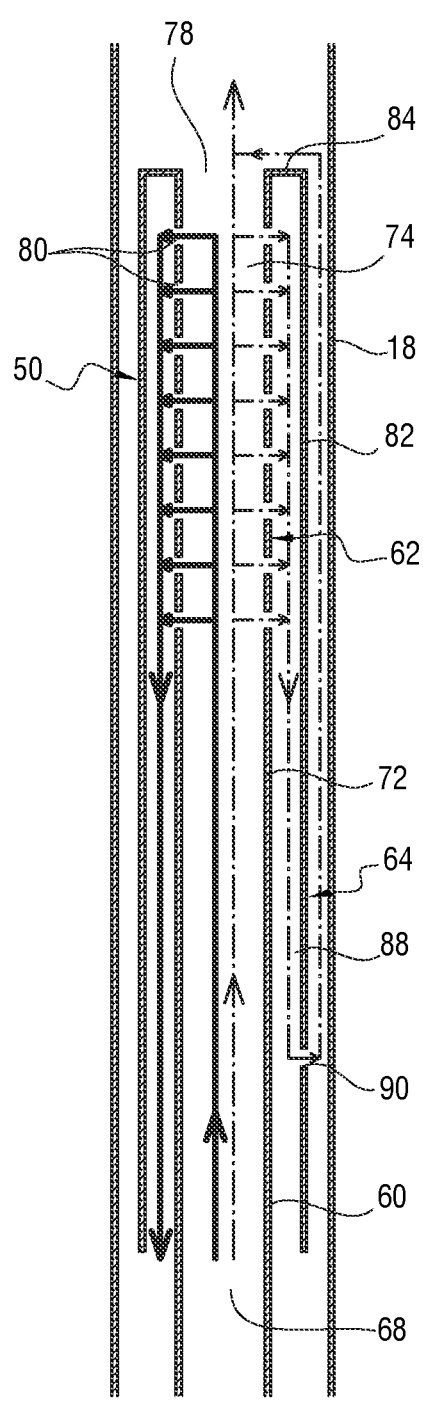
FIG. 4 is a view similar to FIG. 3 showing a variant of the separator of FIG. 2.

In the variant of FIG. 4, the gas recycling passage 90 opens externally in the annular space between the external wall 82 and the production tubing 18. The residual gas is then evacuated upwardly to merge with the gas arising from the upper opening 78 of the first separation stage 62.

Figure 5:
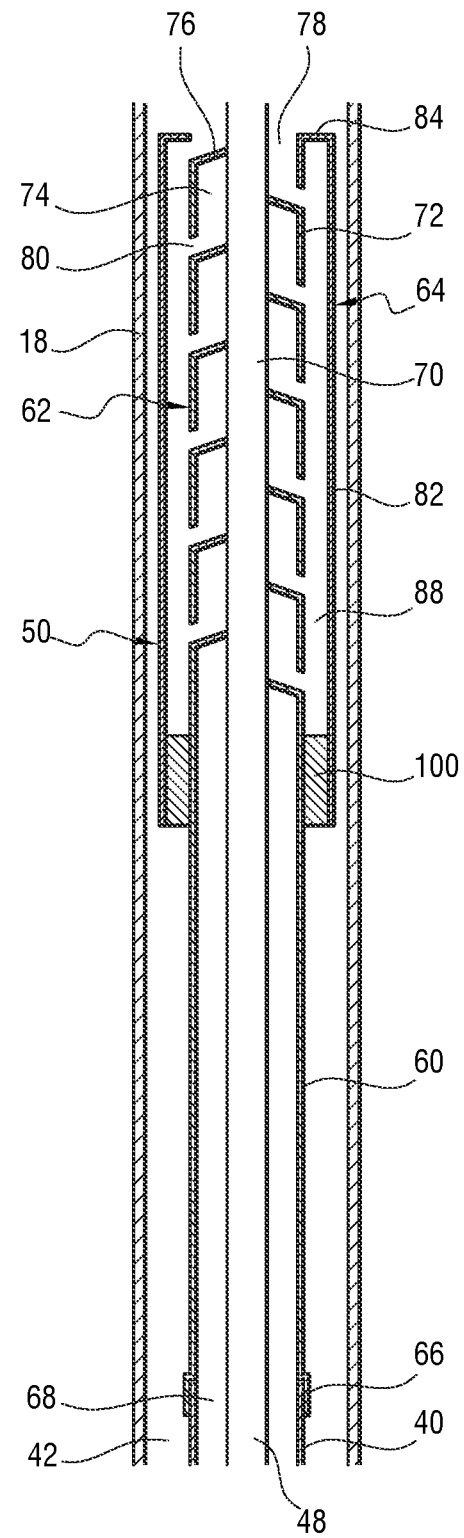
FIG. 5 is a view similar to FIG. 2 of another separator according to the invention.
Figure 6:
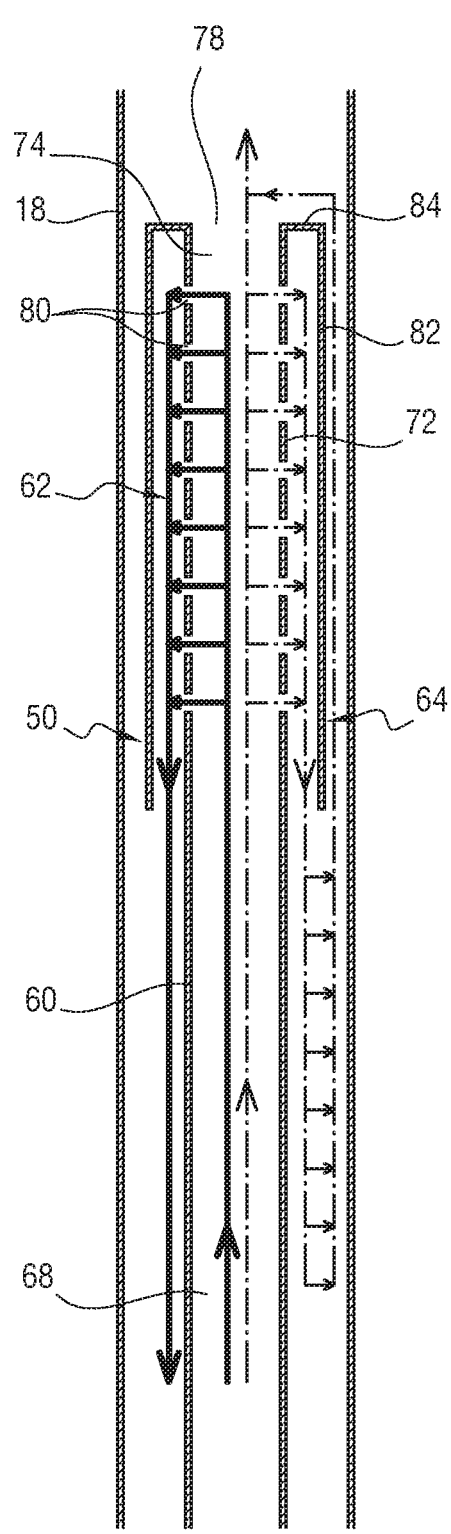
FIG. 6 is a schematic view of the flow circulation in the separator of FIG. 5.

In a variant shown in FIG. 5, the separator 50 differs from the separator 50 shown in FIG. 2 in that the external wall 82 almost only extends along the first separation stage 62. The liquid evacuation canal 88 is without helical outer baffle. The length of the external wall 82 protruding beyond the first separation stage is smaller than three times the maximal transverse dimension of the outer wall 72, preferentially about twice the maximal transverse dimension of the outer wall 72.

The external wall 82 is connected to the upper part of the introduction duct 60 by vertical fins 100. The fins 100 delimit between them vertical passages for circulation of the liquid evacuated through the liquid evacuation canal 88. Their interest is to protect mechanically the baffles 76.

The operation of the separator 50 shown in FIG. 5 differs from the operation of the separator 50 illustrated in FIG. 2 in that the liquid exits the liquid evacuation canal 88 outside of the introduction duct 60, and then enters in a lower annular region 42.

In this region, provided the liquid downward velocity is low enough, the residual gas contained in the liquid is separated from the liquid by gravity and is then collected and rises externally between the external wall 82 and the production tubing 18 to merge with the gas flow arising from the upper opening 78 of the first separation stage 62.

Figure 7:
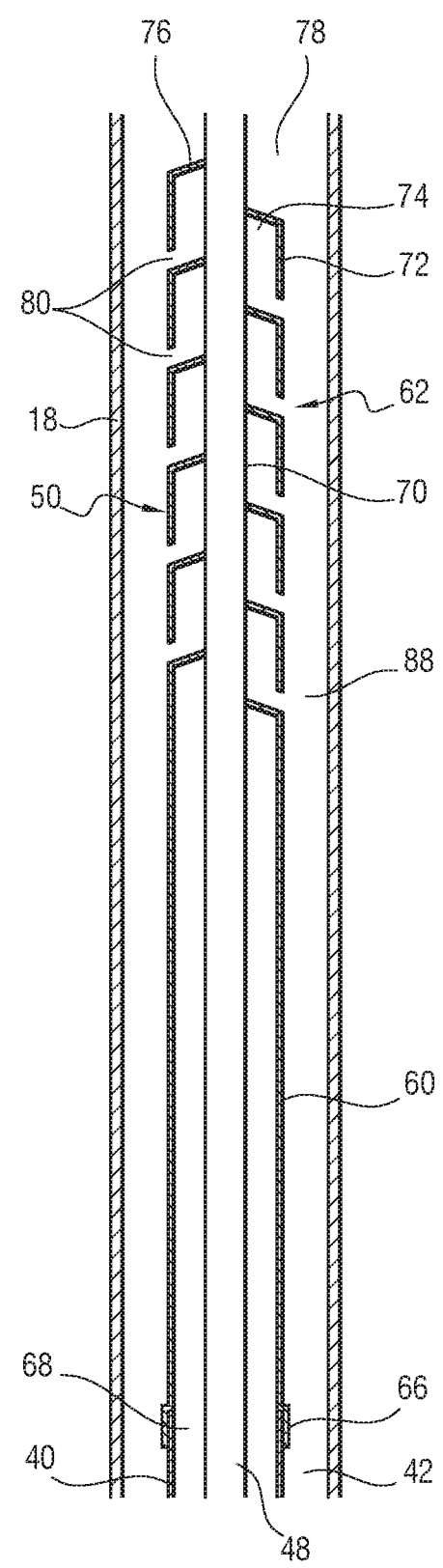
FIG. 7 is a view similar to FIG. 2 of another separator according to the invention.
Figure 8:
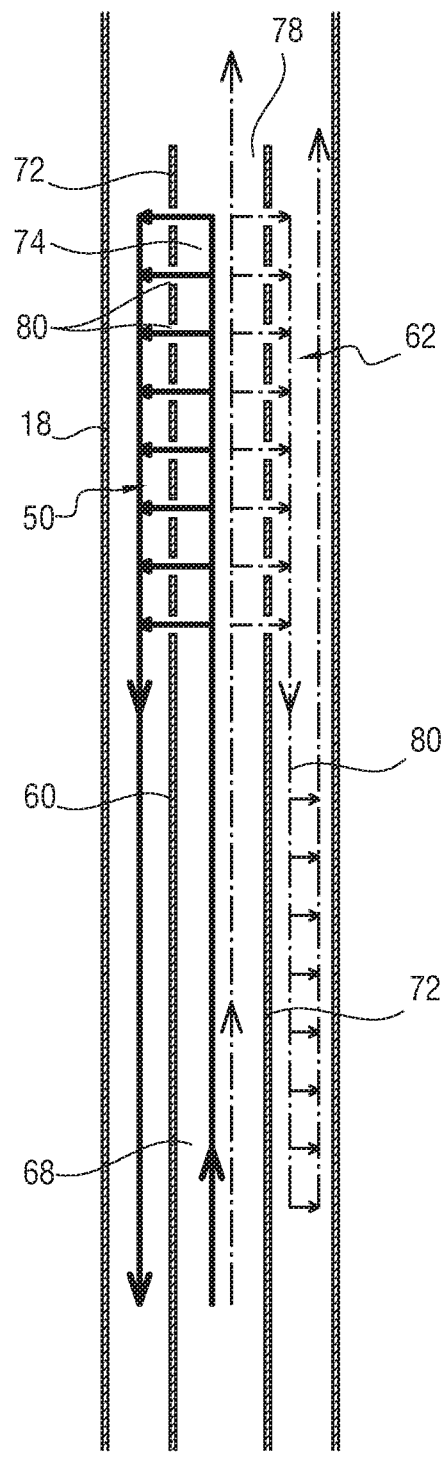
FIG. 8 is a schematic view of the flow circulation in the separator of FIG. 7.

The separator 50 shown in FIG. 7 differs from the separator 50 shown in FIG. 5 in that it does not comprise an external wall 72. A liquid evacuation canal 88 extends directly in the annular intermediary space between the outer peripheral wall 72 and the production tubing 18. The liquid separated in the first separation stage 62 collects in the intermediary space between the outer wall 72 and the production tubing 18 and flows down to the annular space 42 along the outer surface of the outer wall 72 and along the outer surface of the introduction duct 60.

In this region, provided the liquid downward velocity is low enough, the residual gas contained in the liquid is separated from the liquid by gravity and rises to the top of the first separation stage 62 and merges with the gas arising from the upper opening 78 of the first separation stage 62.

The separator 50 shown in FIG. 7 has the advantage of having a very simple structure.

Figure 9:
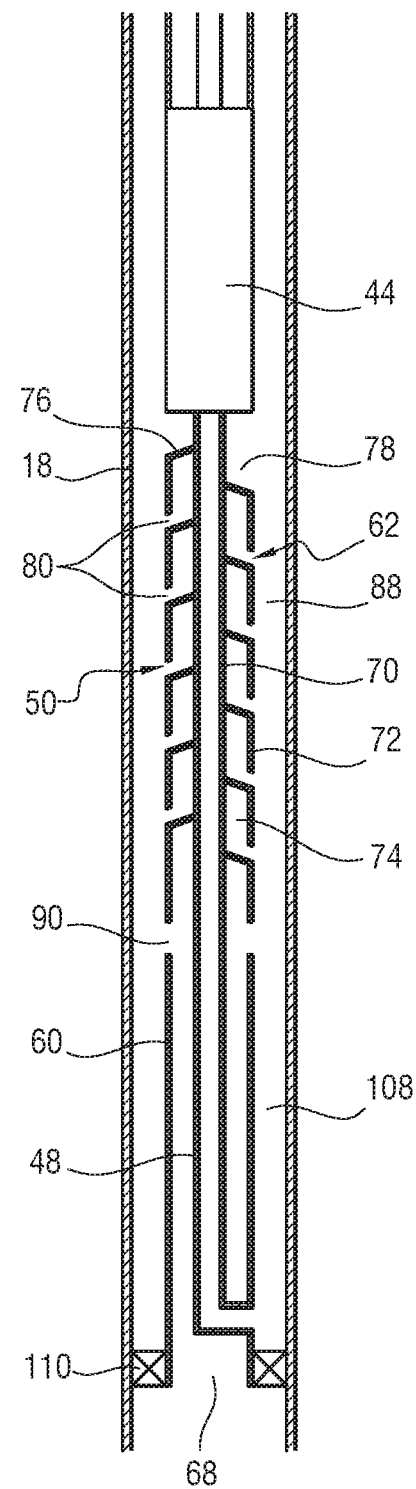
FIG. 9 is a view similar to FIG. 2 of another separator according to the invention.
Figure 10:
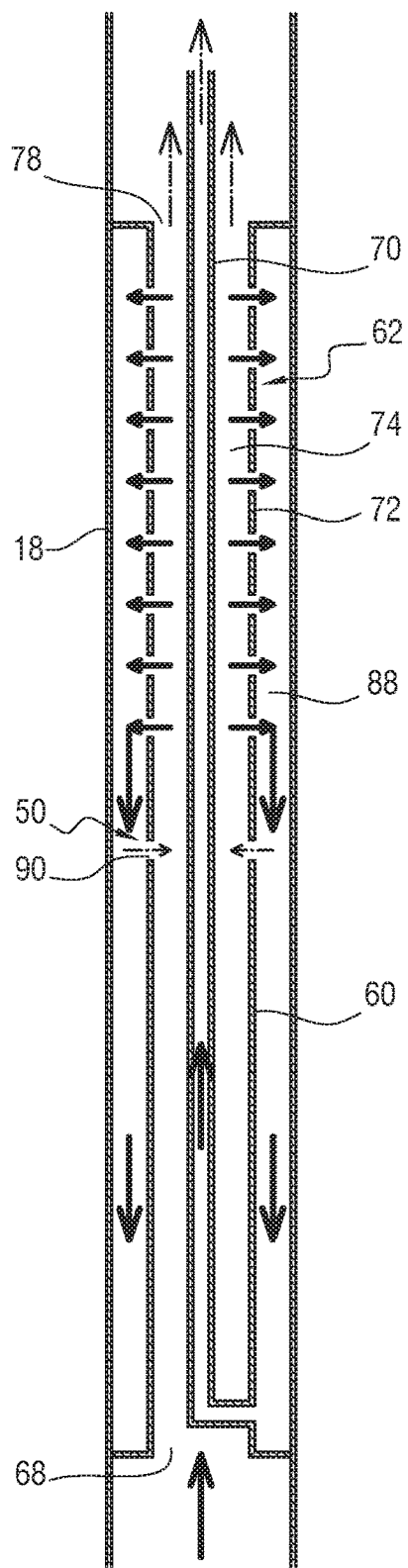
FIG. 10 is a schematic view of the flow circulation in the separator of FIG. 9.

Another extractor 20 according to the invention is shown in FIG. 9. The extractor 20 shown in FIG. 9 differs from the extractor 20 shown in FIG. 1 in that the pump 44 is located above the separator 50. The pump 44 is powered by mechanical, electrical and/or hydraulic power provided from the surface.

The introduction duct 60 of the separator 50 opens downwardly directly into the production tubing 18 and recovers the multiphase fluid stream arising from the reservoir 28.

An inner packer 110 is interposed between the outer surface of the introduction duct 60 and the production tubing 18 to close the outer annular space 108 between the introduction duct 60 and the production tubing 18.

The liquid transportation conduit 48 runs through the introduction duct 60 and through the first separation stage 62, in which it defines the inner wall 70. It emerges upstream at the inlet of the pump 44 and downstream in a lower part of the annular space 108.

In operation, the multiphase fluid stream arising from the reservoir 28 flows up to the introduction duct 60 and enters the first separation stage 62 as described above.

The liquid collected in the first separation stage 62 at the orifices 80 flows down the annular space 108 to the inlet of the liquid transportation conduit 48.

When the pump 44 is active, the liquid is pumped into the liquid transportation conduit 48 to the surface. The pump 44 is for example a progressive cavity pump (PCP) or an electric submersible pump (ESP).

Figure 11:
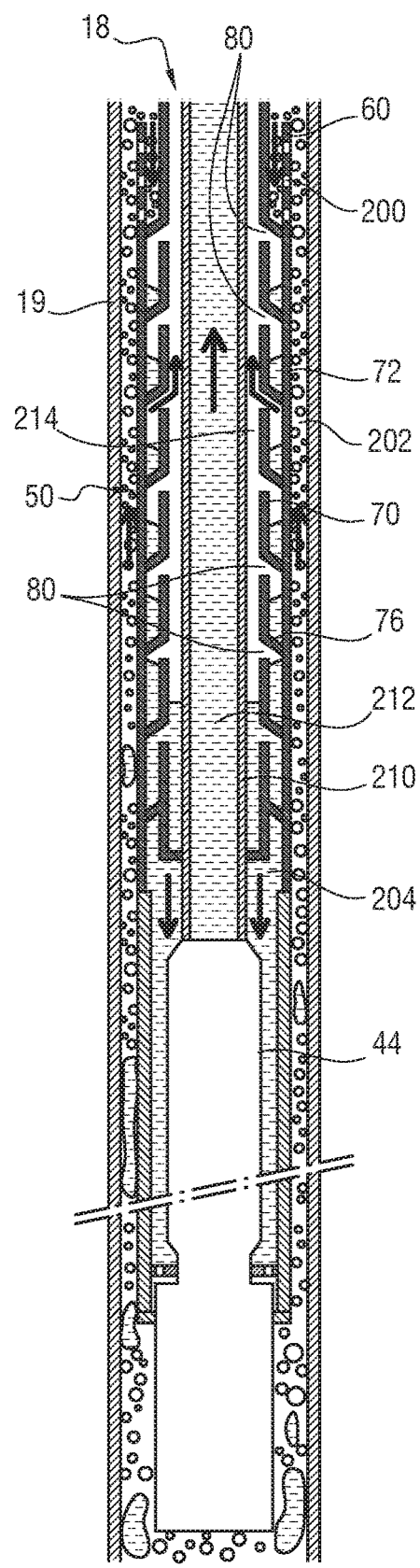
FIG. 11 is a view similar to FIG. 2 of another separator according to the invention.

In a variant shown in FIG. 11, the pump 44 is located below the separator 50 and below the production tubing 18.

The introduction duct 60 is located at the top of the separator 50, in continuity with the outer peripheral wall 72. It advantageously comprises lateral holes 200 connecting with the annular space 202 located between the casing 19 and the separator 50.

The outer peripheral wall 72 is fully solid. It does not comprise any lateral orifice. It defines a lower axial liquid evacuation opening 204 emerging above the admission of the pump 44.

The inner peripheral wall 70 defines staged orifices 80 along turns of the baffle 76.

The separator 50 further comprises an inside central tubing 210 inserted in the inner peripheral wall 70. This central tubing 210 is a lower portion of the production tubing 18. The inside tubing 210 inwardly delimits an inner liquid circulation passage 212 connected to the outlet of the pump 44. The inside tubing 210 and the inner peripheral wall 70 define an intermediate annular gas evacuation canal 214, in which the orifices 80 emerge.

The successive orifices 80 along the turns of the baffle 76 allow a progressive evacuation of the gas inside of the inner peripheral wall 70 to produce, in the evacuation canal 214 a liquid depleted gas stream, which is evacuated upwardly.

In operation, the multiphase fluid stream flows upwards around the pump 44 and around the separator 50 in the annular space 202 defining a multiphase fluid collection space. It then enters the introduction duct 60 by the top and flows down in the introduction duct 60. A progressive natural liquid gas separation occurs in the introduction duct 60.

The multiphase fluid stream then flows down helically along baffle 76. Similarly to the previous embodiments, a combination of separation of gas and liquid by gravity and centrifugation force occurs between the inner peripheral wall 70 and the outer peripheral wall 72.

A centrifugal helical downward movement of the multiphase fluid stream is induced around the axis A-A'. The liquid contained in the multiphase fluid stream is driven towards the outer wall 72, whereas the gas remains closer to the axis A-A'.

The successive orifices 80 along the turns of the baffle 76 allow a progressive evacuation of the gas in the evacuation canal 214 inside of the inner wall 70 to produce a liquid depleted gas stream which is evacuated upwards.

The liquid flows down the separator 50 by gravity to the lower evacuation opening 204, and then, to the admission of the pump 44.

Figure 12:
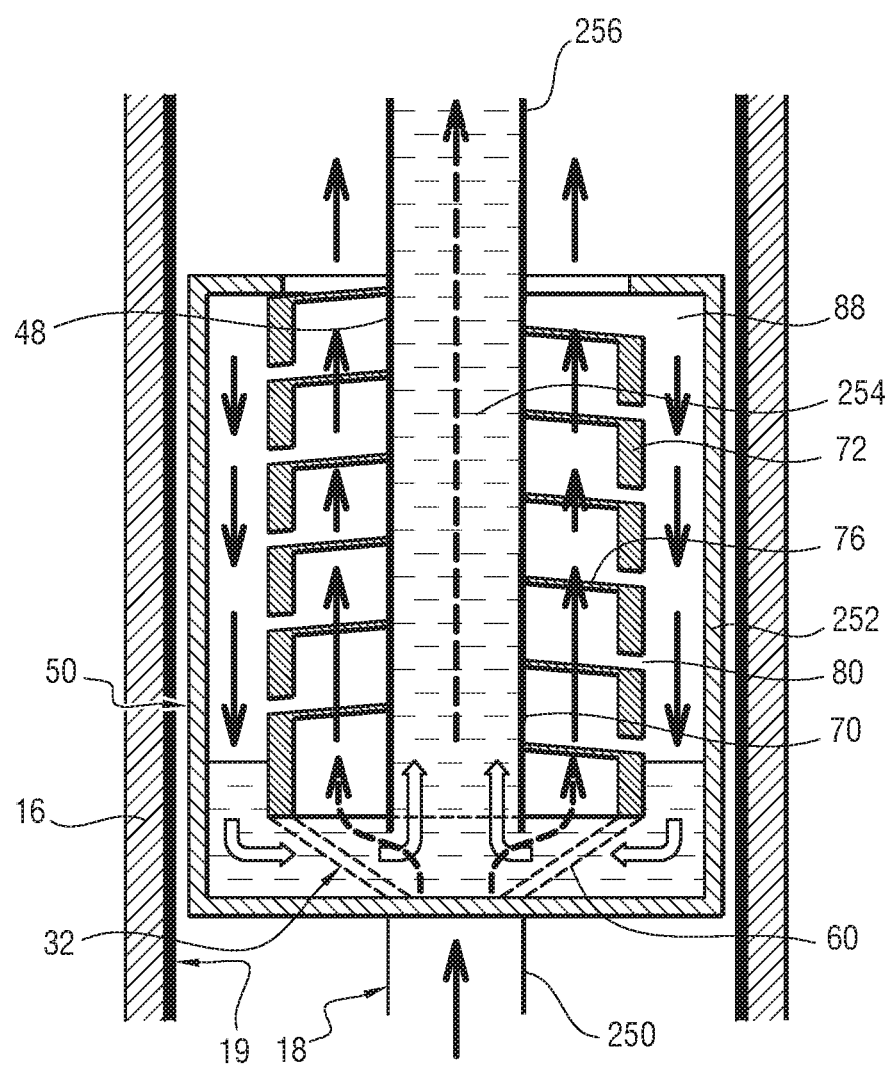
FIG. 12 is a view similar to FIG. 2 of another separator according to the invention.

In a variant shown in FIG. 12, the well is a natural producer with a large ratio of gas versus liquid production (GLR, gas liquid ratio). No pump is required to lift a stream up to the wellhead.

The separator 50 according to the invention is then directly connected on a lower portion 250 of the production tubing 18. It comprises an outer box 252 for confining the liquid evacuated from the orifices 80 and directing it to the bottom of outer box 252. Then, the liquid go through a plurality of lateral passages 32 (usually called "cross-over") to be produced through the liquid evacuation canal 254 provided in the inner peripheral wall 70.

The introduction duct 60 comprises at least an inner canal extending through the bottom of the box 252 to guide the multiphase flow stream at the bottom of the baffle 76 separately from the liquid collected at the bottom of the box 252.

The upper opening 78 of the separator 50 emerges directly in the annular space between the production tubing 18 and the casing 19.

The liquid evacuation canal 254 emerges in an upper portion 256 of the production tubing 18 which collects only liquids.

The separator 50 according to FIG. 15 allows a gas-liquid separation which avoids lots of friction pressure drop due to the large GOR. This friction, which can impede the production from the well, is thus prevented.

Most of the produced free gas (i.e. non dissolved gas at the location of the separator 50) is produced in the annular space between the casing 19 and the production tubing 18. This enhances production of liquid from the reservoir 28 through the production tubing 18.

The invention claimed is:

1. A gas-liquid separator configured to separate a multiphase fluid stream containing hydrocarbons, comprising:
   an introduction duct, the introduction duct defining an introduction opening configured to receive a multiphase fluid stream; and
   a static first separation stage extending along a longitudinal axis, connected with the introduction duct, the first separation stage comprising an outer wall, an inner wall and at least one inner baffle located between the outer wall and the inner wall, the at least one inner baffle being configured to induce an helical movement of the multiphase fluid stream around the longitudinal axis to drive a liquid contained in the multiphase fluid stream onto the outer wall and a gas contained in the multiphase fluid stream onto the inner wall;
   the outer wall having at least one lateral orifice configured to evacuate the liquid separated along the at least one inner baffle, the at least one lateral orifice extending along the at least one inner baffle and defining a lateral staged evacuation of the liquid in a liquid evacuation canal along the outer wall, the first separation stage having at least an upper gas evacuation opening located above the at least one inner baffle;
   the separator comprising a second separation stage, located in the liquid evacuation canal, below the first separation stage, the second separation stage comprising at least an outer baffle configured to induce an helical movement of the liquid to drive a residual gas contained in the liquid towards the introduction duct.

2. The separator according to claim 1, wherein the inner wall contains a liquid transportation conduit, configured to evacuate a liquid collected in the first separation stage.

3. The separator according to claim 1, wherein the inner baffle continuously and helicoidally extends along a longitudinal axis of the first separation stage.

4. The separator according to claim 1, wherein, in a cross section containing a longitudinal axis, the at least one inner baffle comprises successive transverse regions inclined downwardly between an inner peripheral edge and an outer peripheral edge, the at least one lateral orifice being located between two successive transverse regions, above the inner peripheral edge or above the outer peripheral edge.

5. The separator according to claim 1, comprising an external guiding wall, located around the outer wall facing the first separator, the liquid evacuation canal being defined between the external guiding wall and the outer wall.

6. The separator according to claim 5, comprising fins interposed between the external guiding wall and the outer wall below the first separation stage, the liquid evacuation canal emerging downwardly between the fins.

7. The separator according to claim 1, wherein the outer baffle is a continuous helical baffle connected to the outer wall.

8. A hydrocarbon extractor for a well, comprising:
a collection space configured to collect a multiphase fluid stream extracted from a reservoir,
a separator according to claim 1, the collection space being connected to the introduction duct; and
a liquid transportation conduit, to evacuate a liquid separated from the multiphase fluid stream.

9. The extractor according to claim 8, comprising a pump, the inlet of the pump being connected to the separator, the liquid transportation conduit being connected to the outlet of the pump.

10. The extractor according to claim 9, wherein the pump is located below the separator, the pump being configured to be activated at least partially by a turbine driven by a gravitational circulation of the liquid circulating from the separator.

11. The extractor according to claim 8, wherein the liquid transportation conduit extends through the introduction duct and through the first separation stage.

12. A method for separating a multiphase fluid stream into a liquid and a gas comprising:
providing a gas-liquid separator according to claim 1;
feeding a multiphase fluid stream into the introduction duct to the first separation stage;
circulating the multiphase fluid stream in the first separation stage, an helical movement of the multiphase fluid stream being induced along the at least one inner baffle to drive the liquid contained in the hydrocarbon stream onto the outer wall, and to drive a gas contained in the multiphase fluid stream onto the inner wall;
recovering the liquid separated along the at least one inner baffle through the at least one lateral orifice at stages along the longitudinal axis;
evacuating the liquid through the liquid evacuation canal.

13. The separator according to claim 1, wherein the introduction duct defines at least one gas recycling passage, emerging in the introduction duct.

14. The separator according to claim 7 wherein, in a cross section containing the longitudinal axis, the outer baffle defines successive transverse regions inclined downwardly towards the external wall.

15. The separator according to claim 13, wherein the gas recycling passage is located at the top of the second separation stage.

16. A hydrocarbon extractor for a well, comprising:
a collection space configured to collect a multiphase fluid stream containing hydrocarbons extracted from a reservoir,
a gas-liquid separator configured to separate the multiphase fluid stream, comprising:
an introduction duct, the introduction duct defining an introduction opening configured to receive a multiphase fluid stream;
a static first separation stage extending along a longitudinal axis, connected with the introduction duct, the first separation stage comprising an outer wall, an inner wall and at least one inner baffle located between the outer wall and the inner wall, the at least one inner baffle being configured to induce an helical movement of the multiphase fluid stream around the longitudinal axis to drive a liquid contained in the multiphase fluid stream onto the outer wall and a gas contained in the multiphase fluid stream onto the inner wall; the outer wall or/and the inner wall delimiting at least one lateral orifice configured to evacuate a respective one of the liquid or the gas separated along the at least one inner baffle, the at least one lateral orifice extending along the at least one inner baffle and defining a lateral staged evacuation of the respective one of the liquid or the gas in an evacuation canal along the respective one of the outer wall and of the inner wall; the collection space being connected to the introduction duct;
a liquid transportation conduit, to evacuate a liquid separated from the multiphase fluid stream; and
a pump, the inlet of the pump being connected to the separator, the liquid transportation conduit being connected to the outlet of the pump,
the pump being located below the separator, the pump being configured to be activated at least partially by a turbine driven by a gravitational circulation of the liquid circulating from the separator.

* * * * *